(12) United States Patent
Reichow et al.

(10) Patent No.: US 9,958,767 B1
(45) Date of Patent: May 1, 2018

(54) PROJECTION MAPPED AUGMENTATION OF MECHANICALLY ANIMATED OBJECTS

(71) Applicant: DISNEY ENTERPRISES, INC., Burbank, CA (US)

(72) Inventors: Mark A. Reichow, Glendale, CA (US); Steven A. Johnson, Stevenson Ranch, CA (US); Jose A. Gutierrez, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days. days.

(21) Appl. No.: 15/340,572

(22) Filed: Nov. 1, 2016

(51) Int. Cl.
| | |
|---|---|
| *G03B 21/60* | (2014.01) |
| *G06T 13/40* | (2011.01) |
| *H04N 9/31* | (2006.01) |
| *G06K 9/66* | (2006.01) |
| *H04N 5/04* | (2006.01) |
| *G03B 21/58* | (2014.01) |
| *G03B 21/56* | (2006.01) |
| *G03B 21/606* | (2014.01) |

(52) U.S. Cl.
CPC ............ *G03B 21/60* (2013.01); *G03B 21/56* (2013.01); *G03B 21/562* (2013.01); *G03B 21/567* (2013.01); *G03B 21/58* (2013.01); *G03B 21/606* (2013.01); *G06K 9/66* (2013.01); *G06T 13/40* (2013.01); *H04N 5/04* (2013.01); *H04N 9/3141* (2013.01); *H04N 9/3185* (2013.01)

(58) Field of Classification Search
CPC ...... H04N 9/3185; H04N 5/04; H04N 9/3141; G06K 9/66; G06T 13/40; G03B 21/56; G03B 21/562; G03B 21/567; G03B 21/58; G03B 21/60; G03B 21/606

See application file for complete search history.

(56) References Cited

U.S. PATENT DOCUMENTS

| | | | | |
|---|---|---|---|---|
| 3,973,840 A | * | 8/1976 | Jacobs ................... | G03B 21/00 352/10 |
| 5,159,362 A | * | 10/1992 | Monroe ................. | G03B 21/56 352/43 |
| 5,221,937 A | * | 6/1993 | Machtig ................. | G03B 21/00 353/28 |
| 5,940,167 A | * | 8/1999 | Gans ....................... | G03B 21/32 352/43 |
| 2016/0274447 A1 | * | 9/2016 | Grundhofer ......... | G03B 21/606 |

* cited by examiner

*Primary Examiner* — Sultan Chowdhury
*Assistant Examiner* — Magda Cruz
(74) *Attorney, Agent, or Firm* — Marsh Fischmann & Breyfogle LLP; Kent A. Lembke (57) ABSTRACT

A display system configured to provide projection mapped augmentation of mechanically animated objects. These mechanically animated objects may take the form of a screen assembly with a projection surface, and a screen actuator may be included in the display system that is operated by a controller to move, to expand, or other otherwise operate the screen assembly so as to modify or morph the projection surface to move and/or change its shape and/or size. Hence, the screen assembly is animated. The display system further includes a projector operated by the controller, in a synchronized manner with the screen actuator, to project content onto the projection surface as it is moved and/or has its shape and/or size changed over time. The projected content is mapped to the various states and movement of the projection surface to avoid blow-by and to suit the changes of the projection surface.

19 Claims, 5 Drawing Sheets

PROJECTION MAPPED AUGMENTATION OF MECHANICALLY ANIMATED OBJECTS

BACKGROUND

1. Field of the Description

The present description relates, in general, to visual displays or sets with mechanically animated objects and, more particularly, to a display system adapted to use front projection to enhance animation of set objects or props (e.g., to make characters in a displayed story come to life within a scene or display such as one provided in a space adjacent a track of an amusement park ride to entertain riders).

2. Relevant Background

There are many applications where mechanically animated objects are used to bring life to or otherwise enhance a visual display. For example, many amusement park rides include spaces along the ride's track or path in which numerous display systems or assemblies are used to entertain the riders. The entertainment may involve telling a story suited to the ride with animated objects such as robots, animatronic devices, and the like (e.g., devices designed to provide mechanical animation). Often, mechanical animation is used to make a character from the story appear to be alive and talk to the riders or move to perform certain acts. A set of mechanically animated pirates, cowboys, or animal-based characters may stage a fight or otherwise interact, a superhero may perform superhuman acts, and so on to further the storytelling experience or immerse the rider's into the storyline.

As mechanical animation continues to improve, there is an increased demand to include it within more displays and attractions. Unfortunately, mechanically animated objects or characters have become much more complex in their design and implementation. With such increased complexity, there comes increased costs and maintenance challenges. In many cases, an animated figure is a one-off implementation. As a result, the particular mechanical animation becomes locked into the attraction or display for many years as it is very difficult to change or update, e.g., to tell a new story, to fit a seasonal overlay, and so on. The use of complex animated objects or figures has become all but impractical for short-run entertainment such as to provide animation for a one-time parade or a show provided a small number of times.

Hence, there remains a need for display systems and devices to provide animated objects in a set or display space that facilitate changing and refreshing the animated object and that presents reduced complexity to control costs and maintenance issues.

SUMMARY

Briefly, a display system (and associated methods provided by its operations) is provided that is configured to provide projection mapped augmentation of mechanically animated objects. These mechanically animated objects may take the form of a screen assembly with a 2D or 3D projection surface(s), and a screen actuator may be included in the display system that is operated by a controller to move, to expand, or other otherwise operate the screen assembly so as to modify or morph the projection surface to move and/or change its shape and/or size. In this way, the screen assembly itself is mechanically animated. The display system further includes a projector(s) operated by the controller (in a synchronized manner with the screen actuator) to project content onto the projection surface as it is moved and/or has its shape and/or size changed over time. The projected content is mapped to the various states and movement of the projection surface to avoid blow-by (only or mostly project light onto the projection surface) and is also suited to the changes (differing states) of the projection surface (e.g., to reflect the movement of the projection surface, to expand in size or change shape with the projection surface, and so on).

The inventors recognized that many of the capabilities of mechanically animated systems may not be needed to create the illusions of a particular scene or application. For example, dark rides in amusement parks have rider viewpoints that are limited and controlled, and lighting is carefully controlled and set decoration is managed. Hence, complex mechanical animation may simply be unnecessary or overkill as its impact on the viewer (or rider in this example) is not proportional to its cost. Simple mechanical animation, while found in a number of attractions in amusement parks and other settings, is adequate for obtaining gross low frequency motion of an object but is not a ready substitute for characters and objects that require or benefit in their display quality from high frequency animation.

The inventors, in their work designing new rides and attractions for amusement and/or theme parks, identified a recurring issue related to use of mechanical animation. Storytelling and visible characters are key to the foundation of many attraction experiences for visitors to these parks. When designing a new attraction or display, most designers demand an array of visible characters to engage the viewer (rider of a ride vehicle or the like) and to tell a story. In the beginning of the attraction, display, or show development process, large numbers of traditional robotic or animatronic figures and animated props (or objects) are scoped into and/or included in the new design. As the development process continues, though, the reality of what it costs to design and build reliable custom mechanical figures/objects is better understood, and the designer deletes many of these figures and props requiring mechanical animation technologies. Only one or two figures are retained in the new design (e.g., the "hero" or main character of the story being told in the attraction).

Due at least in part to this recurring issue, the inventors understood that there was a need for ways to allow designers to keep more of the characters or objects in the attraction, and the new display system described herein addresses this challenge by providing a way to inexpensively include additional figures that are provided with a mechanically animated screen assembly that provides a projection surface (s) that is augmented or enhanced using projection mapping with a projector (e.g., providing projected content that changes over time to suit the morphing or changing of the projection surface).

More particularly, a display system is provided for projection mapped augmentation of mechanically animated objects. The display system includes a screen assembly with a projection surface (two dimensional (2D) or three dimensional (3D)). The display system further includes a screen actuator operable to transition the projection surface from a predefined initial state through a plurality of predefined transition states to a predefined final (or second state). Typically, in practice, the projection surface in the initial state, the transition states, and the final state differs from other ones of the states in at least one of size and shape. The display system also includes a projector operable to project first media content mapped to the initial state of the projection surface, transition media content, differing from the first media content, mapped to the transition states of the projection surface, and second media content, differing from the first media content and the transition media content, mapped to the final state of the projection surface in the final state. The display system further includes a controller concurrently operating the screen actuator and the projector with time synchronization, and, as a result, the projector projects the first media content when the projection surface is in the initial state, projects the transition media content when the projection surface is in the transition states, and projects the second media content when the projection surface is in the final state.

In some implementations of the display system, the first media content, the transition media content, and the second media content are generated and stored in memory accessible by the controller and/or projector prior to the operating of the screen actuator by the controller. In such implementations, the generation of the first media content, the transition media content, and the second media content includes simulating or predicting alterations in the projection surface from the initial state to the final state and creating media based on the simulated or predicted alterations. The media/animation (or media content) can be thought of as being "rigged" so that as the mechanical screen surface moves (such as in response to a viewer's interactions) the media can be real-time generated to fit the surface of the screen and its surface(s). This provides a visual effect that is similar to that provided with a robotic interactive character responding to nearby people's gestures and actions. The visual and audio sensors sense what the people just did and provide this information to a system controller that uses its programming/software (e.g., a game engine or the like) to respond with an understanding of a proper response (movement of the screen and/or change in media content that may be generated in real time). For example, the screen may be used to provide a character (e.g., an animated character) that is useful to replace a multifunctional animatronic character with a projectormatronic character so that instead of mechanical facial (and other) responses a rigged, real-time rendered facial response is provided via projection onto the screen.

In some embodiments, the projection surface is 3D and is modified in all three dimensions by the screen actuator to transition the projection surface between the initial and final states. In the same or other embodiments, the screen actuator is operable to provide the transition of the projection surface using inflation, folding, bending, stretching, pushing in and out, and rolling and unfurling the projection surface. In some cases, it is desirable that the projection surface be positioned within a display space and that the display system further includes a contextual display assembly operable to project or light the display space or objects placed in the display space based on and in synchronization with the first media content, the transition media content, and the second media content. In such cases, the first media content, the transition media content, or the second media content includes at least one feature linked to operations of the contextual display assembly.

According to another aspect of the present description, a method is provided for creating a display in a display space (e.g., a space along a ride path/track in an amusement park ride or a stage of a theatrical show). The method includes generating first and second media content and, after the generating, providing a projection screen with a predefined shape and size in the display space. The method further includes projecting the first media content onto the projection screen. Significantly, the method also includes modifying (or morphing) the projection screen to alter at least one of the shape and the size of the projection screen. The method further includes, concurrently with the modifying of the projection screen, projecting the second media content onto the projection screen. Typically, in practice, the first media content is mapped to the shape and size of the projection screen during the projecting of the first media content and during the modifying of the projection screen. Also, the second media content is mapped to the modified shape and size during the projecting of the second media content.

In some embodiments of the method, the step of generating of the first and second media content includes generating simulations of the projection screen during the modifying and then creating media content mapped to shapes and sizes of the generated simulations of the projection screen. In some implementations, the projection screen has a 3D surface and the modifying of the projection screen includes changing the 3D surface in three dimensions. In these and other implementations, the second media content is mapped to the projection screen during transitions in the shape or the size during the modifying step. Further, the method may include the step of projecting first light or content onto surfaces in the display space proximate to the projection screen and also the step of projecting second light or content onto the surfaces in the display space proximate to the projection screen. In such implementations of the method, the second light or content differs from the first light or content and is chosen based on the second media content.

DETAILED DESCRIPTION OF THE PREFERRED EMBODIMENTS

A display system is provided that is designed to provide projection mapped augmentation of mechanically animated objects. For example, the animated objects may be provided as a projection screen assembly with one or more projection surfaces and a projector for projecting onto the projection surfaces content mapped to the projection surfaces. A screen actuator is included in the system that is operated by a system controller to morph/change in shape and/or size the projection surfaces (e.g., in 2D or 3D) and/or to move or be animated (again, in 2D or 3D), and the projector is operated to project content that is matched to these changing projection surfaces both in the shape, size, and location of the projection surfaces and with content suited to the projection surfaces.

For example, a video may be captured of a character performing a choreographed dance involving moving their head, arms, legs, and torso in two or three directions. The screen assembly is adapted to be moved or operated by the screen actuator to provide a changing projection surface(s) with a shape, size, and location that changes over time to match the choreographed dance. With this dance example, the characters right arm may initially be positioned down and by the side of the character's torso (a first or initial state of the projection surface) and then to be raised upward above the character's head (a second or initial state of the projection surface). The projector content may be designed to include first or initial content projected on the arm-portion of the projection surface when adjacent to the torso, to include second or final content projected on the arm-portion of the projection surface when over the character's head, and also to include transition or third content projected on the arm-portion of the projection surface as it moves from the lower or first position to the raised or second/final position. The content being projected is mapped to the projection surface so that little or no blow-by occurs (e.g., using projection mapping), and the screen assembly's elements (e.g., an arm element providing the arm-portion of the projection surface) are sized and shaped (both of which may be modified in 2D or 3D by the screen actuator over time) to match the projected content such that a shadow is thrown into the display space behind the screen assembly from other light in the space (e.g., as would be the case if conventional animatronics or mechanical animation without projection-based augmentation were used).

As will understood based on the following discussion, the display system provides a blending of low frequency and reliable mechanical animation with high definition projection onto the mechanically animated objects and characters (e.g., elements of a screen assembly that each provides a 2D or 3D projection surface (or together make up the current projection surface presented to a projector for front projection)). Such blending achieves many advantages of both with high reliability and cost effective gross mechanical motion augmented with high-definition projection for high frequency animation as in faces of a character, subtle cloth and hair movements, and the like that would be difficult to achieve with conventional mechanical animation. Further improvement is achieved by coordinating the projection with practical effects in a scene (provided in a display space) so that lighting changes, air movement, and the like in the display space that affect a scene also affect the projection (the projected content changes to suit these changes in the display space that may be controlled by a contextual display assembly included in the display system and linked to the system's controller for time-synchronized operations).

The display system also may be described as functioning to combine a library of mechanical effect devices (e.g., the screen actuator may provide sliding, inflating, bouncing, fanning, unfurling, stretching, folding, and so on of the screen assembly elements and their corresponding projection surfaces) with a corresponding library of visual effects (changing content) that can be projected to blend with and augment the mechanical effects. Example screen and projection combinations can range from quite simple (e.g., an Oriental fan unfolding to provide a morphing/changing projection surface while a projector is operated to project onto the projection surface before, during, and after the morphing/changing to provide depth and detail of the Oriental fan with projection rather than expensive fabric) to quite complex (e.g., an animated superhero character that morphs in size (grows in size) and shape in three dimensions such as with simple inflatable bladders used as the screen assembly elements while projected content or projection is used to provide the detailed skin color, shading, and texture changes of the superhero character).

Figure 1:
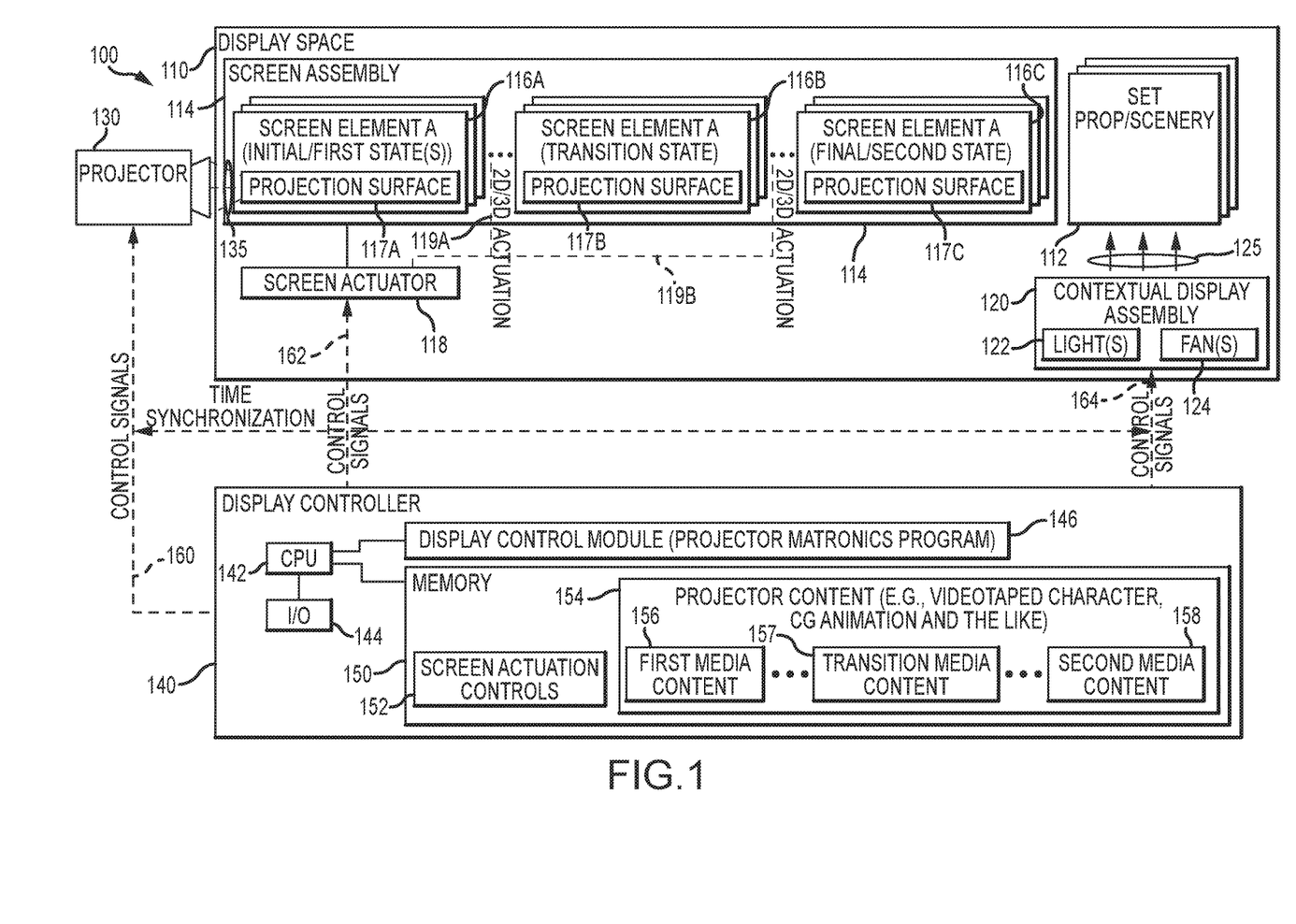
FIG. 1 is a functional block diagram of a display system of the present description.

FIG. 1 is a functional block diagram of an exemplary display system 100 of the present description configured to implement the concept of "projectormatronics" in which mechanically actuated objects are enhanced with video or projected content mapped to their surfaces. The display system 100 includes a display space 110 such as a set or stage where it is desirable to present a visual effects show, to provide a storytelling display, a theatrical stage, or the like. The display space 110 may include set props and/or scenery items 112 such as backdrops or walls with artistic renderings, curtains, and other items as well as show-specific items suited for the story being told or the visual effects provided with the display system 100.

A contextual display assembly 120 is also positioned in or near the display space 110, and this assembly 120 may include lights 122 that illuminate the space 110 including the set props/scenery elements 112 and other items placed in the space including the screen assembly 114. Hence, the lights 122 at least partially set the illumination levels (and colors and other lighting-based effects) for the space 110 during a show. Further, the assembly 120 may include fans 124 or other items that affect (e.g., move with a breeze/air flow) props 112 as shown with arrows 125 (which may also include light from lights 122), and, as explained below, content projected onto the screen assembly 114 from projector 130 may be designed/configured to match the lighting and/or output 125 from the contextual display assembly 120 over the timeline of a show/display provided by operation of the display system 100.

A screen assembly 114 is provided in the display space 110 as part of the system 100. The screen assembly 114 is adapted to provide a projection surface(s) that changes or morphs in two dimensions or three dimension during a display or show (e.g., during operation of the display system 100) and content projected onto the projection surface(s) is mapped to the changing/morphing projection surface and may vary over time to suit the new shape, size, and/or location of the projection surface(s).

To this end, the screen assembly 114 includes one or more screen elements that are operable with a screen actuator (or actuators) 118 to change in shape, size, and/or location over time (along the timeline of a show or display). As shown, at a first time, a screen element 116A is in an initial or first state and includes a projection surface 117A (also in this first state as it may change/morph over time with changing/morphing of the screen element 116A). At 119A, the screen actuator 118 is shown to be operating to provide 2D or 3D actuation of the screen element 116B and its projection surface 117B to be in one or more transition states. Further, the screen actuator 118 is shown at 119B to be operating so as to provide 2D or 3D actuation of the screen element 116C and its projection surface 117C to a second or final state.

The screen actuator 118 may be thought of as providing mechanical animation 119A, 119B of the screen element 116A, 116B, 116C. The screen elements may take a wide variety of forms to practice the display system 110 and, as a result or to provide actuation, the screen actuator 118 may also take a wide variety of forms to move or actuate the screen element in two or three dimensions. Hence, the projection surface 117A, 117B, 117C may be planar (with nearly any outer shape), may be curved/arcuate or some other 3D shape, and so on, and the projection surfaces of the group of screen elements 116A-116C may in combination be thought of as a single projection surface that changes in shape, size, and/or location (in 2D or 3D) during operation of the display system 100 and that generally faces in the direction of a projector 130 for front projection as shown at 135.

The actuation 119A and/or 119B may simply involve moving the screen element from a first position to a second position (e.g., screen element 116A is in a first position and screen element 116C is in a second position) such as with rotation, with sliding left/right, up/down, and/or forward/rearward, and the like. The actuation by the screen actuator 118 may take the form of inflation/deflation such as when the screen element 116A-116C contains one or more bladders (e.g., a balloon screen element formed of latex, Spandex, rubber, or the like), which would provide 3D actuation changing the shape and size of the projection surface 117A-117C during a show or over a display's timeline. The screen element 116A-116C may be configured to be folded/unfolded and/or furled/unfurled, and the actuator 118 may act at 119A and 119B to provide such actuation such as to unfold an Oriental fan-type screen element 116A from a closed/folded first state through transition states 116B to a fully (more) open state 116C with corresponding changes in the size and shape of the projection screen 117A-117C (e.g., from a small rectangle to a semi-circular shape). The actuation may also include bending, stretching, pushing in and out, and rolling the screen element 116A-116C to provide the morphing projection surface 117A-117C with the actuator 118.

The display system 100 also includes a projector(s) 130 such as a video projector. The projector 130 may be in the display space 110 or, as shown, outside but proximate to the display space 110, The projector 130 is operated during operation of the system 100 to project light or projected content 135 onto the projection surface 117A, 117B, 117C concurrently with actuation 119A and 119B of the screen element 116A-116C by the screen actuator 118. Projection mapping is used to accurately map the projected content 135 onto the changing/morphing and/or moving projection surface 117A-117C so as to eliminate or limit blow-by into the display space 110. The projected content 135 acts to augment the mechanically animated objects or screen elements 116A-116C, with the mechanical animation 119A and 119B generally providing relatively slow and large movements and the projected content 135 providing fine detail or high frequency animation.

The display system 100 includes a display controller 140, which may take the form of a specific-purpose computer or computing device specially adapted for use in controlling the various components of the display system 100 in a synchronized manner (e.g., with time synchronization as shown in FIG. 1). The controller 140 includes a processor(s) 142 that manages operations of a set of input/output (I/O) devices 144 such as a monitor operated to display information and/or a graphical user interface (GUI) to an operator of the controller 140, a touchscreen/pad, a mouse, a keyboard, and other components to allow the operator to provide user input and interact with displayed display and/or control data. For example, the operator may be allowed to select a particular show or display to provide with the display system 100, which may include choosing content to project from the projector 130 as shown at 135 and selecting corresponding screen actuation controls as these two portions of the display system 100 are carefully coordinated as discussed throughout this description to provide a desired visual effect (e.g., of a projector-augmented mechanically animated object in the display space 110).

The display controller 140 uses the processor 142 to execute code in computer readable media (e.g., to run a software program) to provide the control functions described herein. This is shown with the CPU 142 running a display control module (e.g., a "projectormatronics" program) 146. The display control module 146 is configured to generate and transmit control signals 160 to the projector 130 to cause it to project the media content/light 135 onto the projection surface 117A-117C. Further, the display control module 146 acts to generate and transmit control signals 162 to the screen actuator 118 to cause it to actuate 119A and 119B the screen element 116A-116C. Still further, the display control module 146 generates and transmits control signals 164 to the contextual display assembly 164 to cause one or more of its components (e.g., the lights 122, the fans 124, or the like) to provide output that affects the display space 110 such as by illuminating props/scenery elements 112, causing airflow in the display space 110, and so on. The control signals 160, 162, 164 may be transmitted in a wired or wireless manner.

Significantly, the signals 160, 162, 164 are time synchronized along a display or show timeline (or over the operating period of the display system 100) so as to coordinate the operations of the projector 130, the screen actuator 118, and the contextual display assembly 120 to achieve desired visual display effects such as by mapping the projected content 135 to the moving or morphing screen element 116A-116C and its projection surface 117A-117C. In other words, the shape, size, and/or location of the projected light/content 135 may change over time and/or concurrently with moving and morphing (size/shape) of the projection surface 117A-117C, and, further, the actual content being projected can change too to suit or match the movement and/or changes in the projection surface 117A-117C or to suit changes in operations of the contextual display assembly 120 (e.g., show videotaped or CG material that reflects changes in airflow from fans 124 or shows changing in the lighting levels/colors from lights 122 over time or along the display/show timeline).

To this end, the display controller 140 is shown to include memory/data storage 150 (or memory/data storage may be accessible by the control module 146 such as over a digital communications network on a remote server or other device), which is managed by the processor 142 such as for access by the display control module 146. The memory 150 is shown to store a set of screen actuation controls 152, and these are used by the display control module 146 to provide the control signals 162 to the screen actuator 118 to selectively animate (with 2D or 3D actuation 119A and 119B) the screen element 116A-116C during a time period associated with display/show (e.g., particular mechanical animation 119A or 119B at predefined times along a display/show timeline). The memory 150 also stores projector content 154 that is used by the display control module 146 to provide the control signals 160 for operating the projector 130 to output the projected content/light 135 onto the projection surface 117A-117C.

The content 154 may take a wide variety of forms such as videotaped content of a character or object going through a series of actions that correspond to the moving and/or morphing of the projection surface 117A-117C with the actuation 119A and 119B or a CG animation file of a character or object that is again chosen or designed to suit the size, shape, and location of the projection surface 117A-117C over the timeline of the display/show. This is shown/explained in FIG. 1 with the projector content 154 including first media content 156, transition media content 157, and second media content 158 that can be projected by the projector 130 as shown at 135. Such projection 135 is time synchronized to operation of the screen actuator 118 such that the first media content 156 is projected 135: (a) onto the projection surface 117A with the surface 117A and/or screen element 116A in a first or initial state; (b) onto the projection surface 117B with the surface 117B and/or screen element 116B in one or more transition states; and (c) onto the projection surface 117C with the surface 117C and/or screen element 116C in a second or final state.

Figure 2:
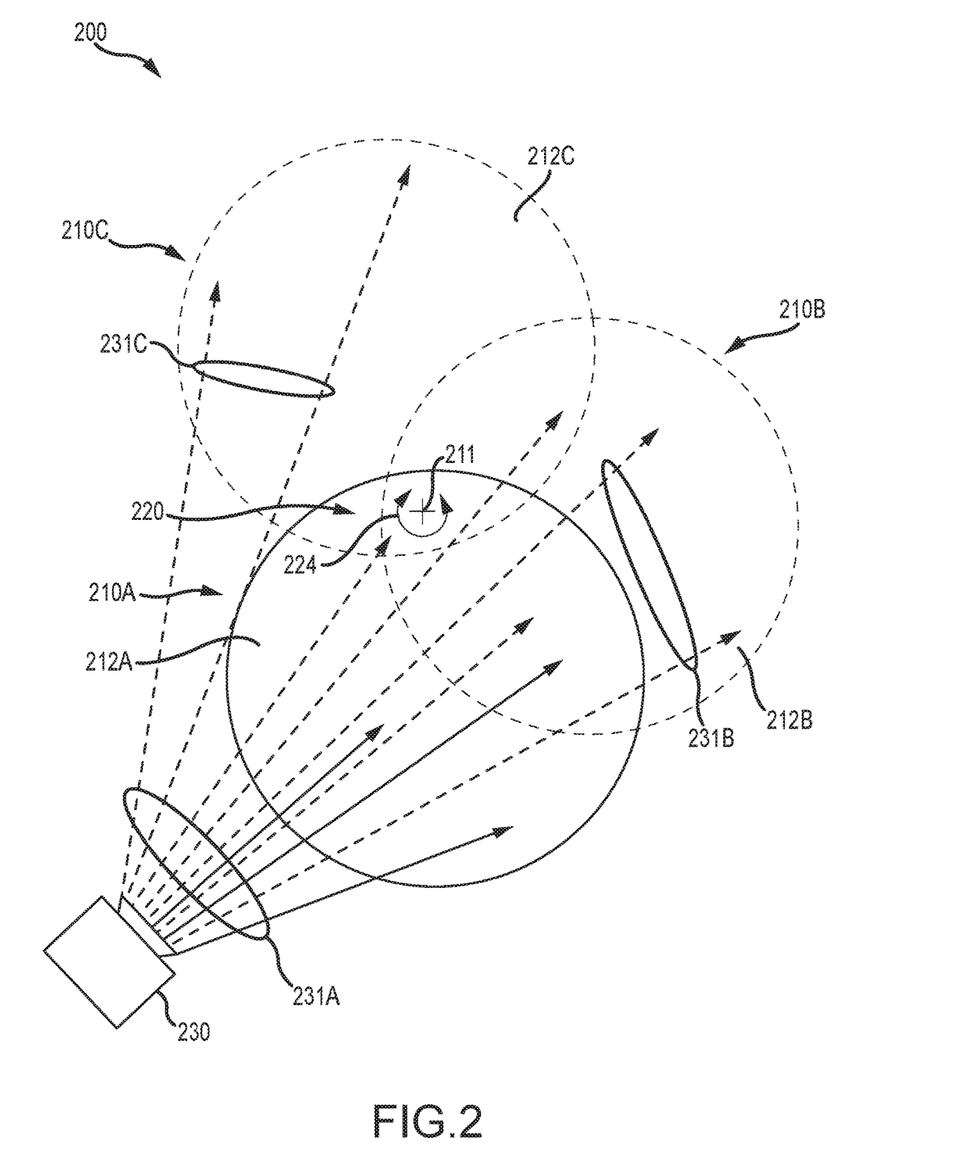
FIG. 2 illustrates a screen element, which may be included in a display system such as the system of FIG. 1, that is moved (i.e., rotated) to provide a projection surface in a set of locations over time.

To understand operation and implementations of the display system 100, it may be useful to provide a number of examples of screen elements and actuators that may be used to provide a moving and/or morphing projection surface. FIG. 2 illustrates a relatively simple implementation of a display system 200 with a video projector 230 and a screen element with at least 2D actuation.

Particularly, in a first or initial state, a screen element 210A is provided in a first position relative to a rotation axis 211 such that a circular (or other shape in other cases) shaped projection surface 212A is facing the projector 230 for front projection of initial or first content/light 231A. The display system 200 includes a screen actuator 220 positioned behind the screen element 210A that is configured to respond to control signals from a controller (not shown) to rotate as shown with arrow 224 the screen element 210A about its rotation axis 211. The actuator 220 may be operated to rotate 224 the screen element 210B through a number of transition states, which results in the projection surface 212B being moved or having its location changed during this transition. Concurrently with such rotation 224, the projector 230 is operated by a controller to project different content in the form of transition media content/light 231B that is mapped in location to the projection surface 212B (and, in some cases, its content also changes). The actuator 220 continues to operate to rotate/move 224 the screen element 210C into a second or final state with the projection screen 212C in a new location, and the projector 230 is operated/controlled to project second media content 231C onto the relocated/moved projection surface 212C.

Hence, the actuation 224 provided by the screen actuator 220 is two dimensional as the surface 212A-212C is planar and remains within a single plane. In other cases, though, the rotation 224 is combined with other actuation to provide 3D actuation. For example, the screen actuator 220 may be configured to slide or push/pull the screen element 212A-212C in the Z direction or along the rotation axis 211 (in and out of the plane of the paper showing FIG. 2). In other cases, the screen element 210 is not a rigid planar body as shown in FIG. 2 but is, instead, formed of a flexible and/or resilient material that can be stretched such as with inflation (e.g., a bladder may be provided in the body of screen element 210), with application of a mechanical force such as with a plunger to cause the shape of the projection surface from planar to curved/arcuate, with application of tensile forces at one or more locations about the periphery of the screen element's body so as to change the shape and/or size of the projection surface 212A-212C while the screen element is rotated 224 or held still in one of the positions. The projected content from the projector 230 would be modified or designed to suit any of these changes so as to mate the content and to map the content to the moving and/or morphing projection surface 212A-212C.

Figure 3A:
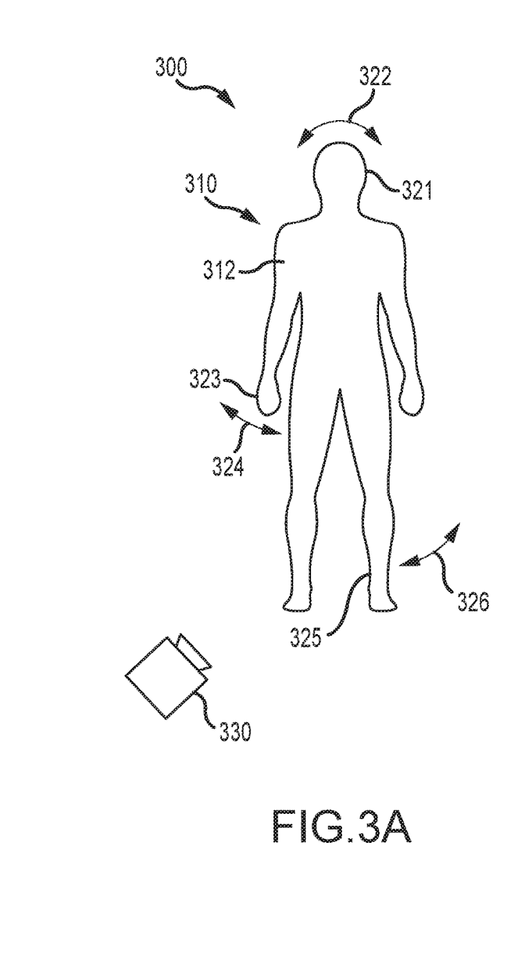
FIGS. 3A-3C illustrate, respectively, a portion of a display system with a screen element configured to provide a projection surface shaped as a silhouette of a character for front projection, the screen element actuated to a first state with first content projected upon the projection surface, and the screen element actuated to a second state with second content projected upon its projection surface.

The techniques of using projection to augment mechanically animated objects is very well suited for presenting characters and moving objects in a set or display space. FIG. 3A shows a portion of a display system 300 that includes a screen element 310 that includes a projection surface 312 useful for front projection from a video projector 330 (not projecting in FIG. 3A). The screen element 310 may be thought of as including a substantially planar body (e.g., a rigid body with a thickness of 0.25 to 0.5 inches or the like) with several components or members that can be actuated to cause the projection surface 312 to move in location and/or morph in shape or size.

For example, a screen actuator (not shown but understood from FIG. 1 and the description provided herein) can be selectively operated to move or actuate (in 2D or 3D) the head 321 as shown with arrow 322, an arm 323 as shown with arrow 324, and a leg 325 as shown with arrow 326. As shown, the screen element 310 is configured to generally have a shape of a person's (or other similar character's) silhouette (e.g., outer boundaries or outline of a person or similar character/figure). In use, the screen element 310 is positioned within a display space at a location and with an orientation suited to a location at which a person was videotaped in that same display space (or a location matching where a CG animation was created for insertion into that display space).

Figure 3B:
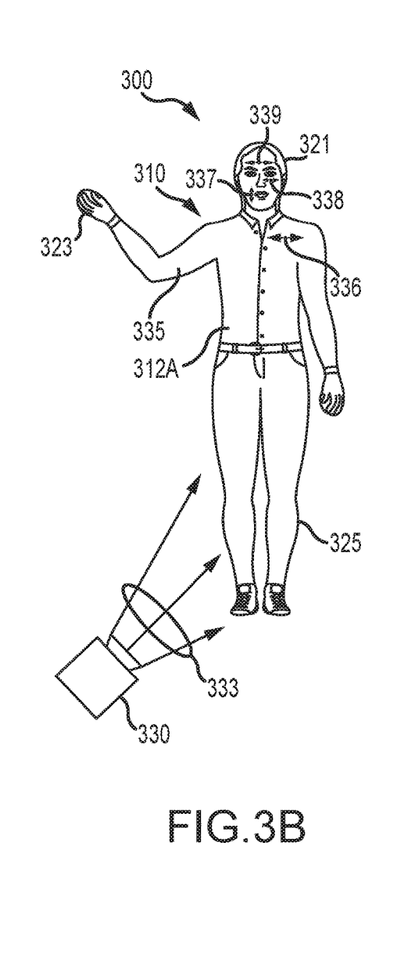

In FIG. 3B, the actuator assembly has been operated to actuate the screen element 310 (e.g., to provide mechanical animation 324, 326 to the element 310). As a result, the projection surface 312A is in a new state with the arm 323 raised instead of being lowered near the silhouette's torso/body and with the leg 325 moved toward or together with the other stationary leg. This mechanical animation or actuation by the actuator assembly has morphed or modified the projection surface 312A such that it has a new shape (or portions of it have a new location).

The projector 330 is being operated to project content/light 333 onto this projection surface 312A as shown at 335 that causes the image of a character (e.g., a person) to be reflected from the surface 312A of the screen element 310 to a viewer of the display space in which the screen element 310 is provided/positioned. In practice, the screen actuator provides slow and gross animation while the video content 333 providing the animated imagery 335 provides high frequency animation or augmentation. Particularly, the character's face is provided in great detail with animation provided as shown with arrows 337, 338, 339 corresponding with the character talking, moving their eyes, and having their hair flow/move in response to airflow in the display space (e.g., provided by a fan in a contextual display assembly). Further, the character provided with reflected content 335 is wearing clothes that are shown to move 336 in response to airflow in the display space (or movement of the screen element 310).

Figure 3C:
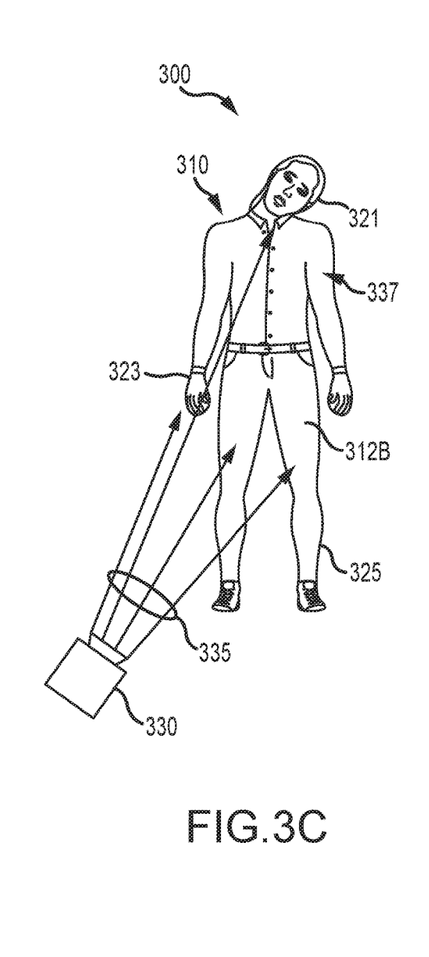

In FIG. 3C, the screen actuator has further operated to return the arm 323 to its down or original position of FIG. 3A, to move the leg 325 back away from the other stationary leg, and to tilt or rotate the head 321 downward to one side. In this way, the screen element 310 is in a new state such that projection surface 312B differs from projection surface 335 in shape (or location of portions such as head 321, arm 323, and leg 325). The content/light 335 being projected is chosen (by a controller) to differ, too, in its mapping (i.e., mapped to new silhouette shape/location) and also what is being displayed as the animated character (e.g., reflected content 337) reflected from the surface 312B has changed (e.g., a different facial expression, different movement/location their eyes/pupils, and so on).

Figure 4A:
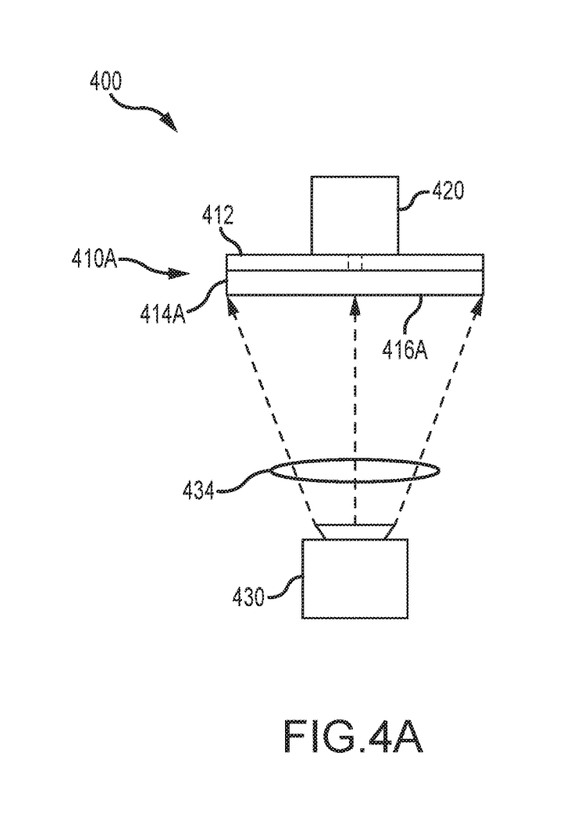
FIGS. 4A and 4B illustrate, respectively, a portion of a display system with a screen element with a morphable/changeable screen element to provide a projection surface that changes its shape and size over time.
Figure 4B:
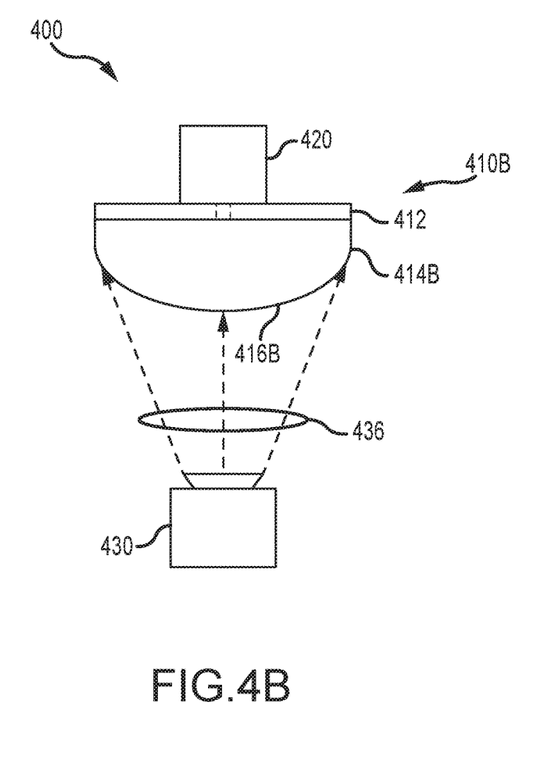

FIGS. 4A and 4B illustrate a display system 400 as it is operated to morph or modify a screen element during projection of changing content to provide projection-based augmentation of the mechanically animated (e.g., with inflation/deflation). Particularly, the display system 400 is shown with its screen element 410A in a first or initial state, and the screen element 410A includes a base or rear support member 412 and a bladder member 414A providing a projection surface 416A. The surface 416A faces a projector 430 of the display system 400, which is being operated with the screen element 410A in this first state to project first content onto the projection surface 416A as shown with arrows 434. In this state or operating mode, a screen actuator 420 of the display system 400 has been operated to deflate the bladder member 414A (or reduce the volume and/or pressure of gas (or liquid) in the bladder member 414A). This causes the bladder member 414A to be relatively flat and the projection surface 416A to also be planar or relatively planar and to have a first size and shape.

FIG. 4B shows the display system 400 after the actuator 420 has operated to actuate (with 3D actuation) the screen element 410B to place it in a second state. In this second state, the bladder member 414B has been inflated with gas (or liquid) such that the projection surface 416B has a greater size and a different/morphed shape (e.g., an arcuate shape rather than a planar shape). The projector 430 is being operated (by a controller not shown) to project different content as shown at 436 that is mapped to the surface 416B and may vary in content to suit the changed projection surface 416B. For example, a superhero character may be projected onto the projection surface with its mild mannered or smaller version shown with content 434 with the projection surface 416A in its first state and with is ready-for-action or larger version shown with content 436 with the projection surface 416B in its second state.

Figure 5:
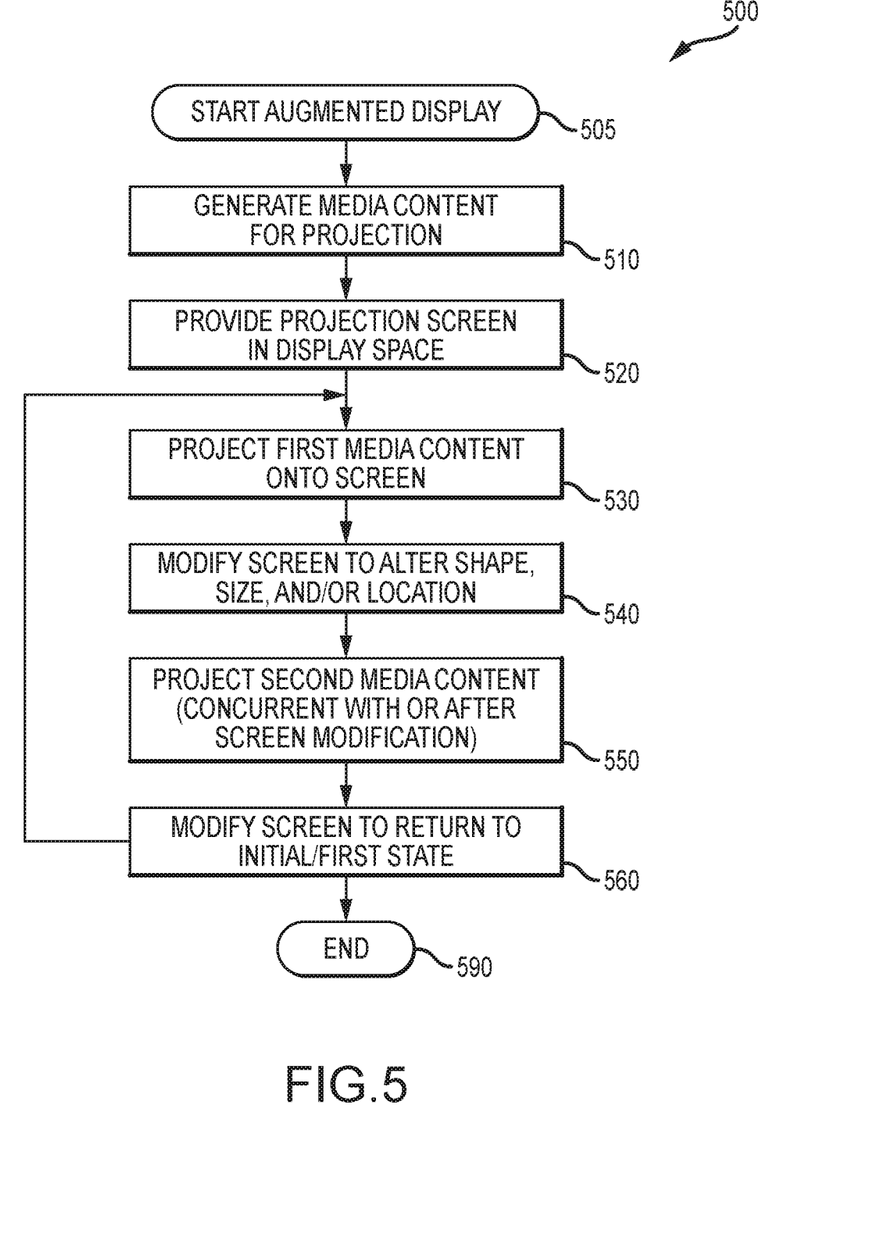
FIG. 5 is a flow diagram of a method of providing a display with a mechanically animated object with projection-based augmentation.

FIG. 5 illustrates a method 500 of providing a display that includes a mechanically animated object (e.g., an actuatable or morphable projection screen) and providing projection-based augmentation of this object (before, during, and/or after it is morphed/actuated). The method 500 starts at 505 such as with planning or designing a display or show to be presented with a display system (such as system 100 of FIG. 1) such as to select a story to tell/present, select a short scene from a movie, and so on, which may include defining one or more characters or objects to be included in the display/show and provided with augmentation of a mechanically animated object according to the present description. Step 505 may then involve creating props and other scenery elements for the display (e.g., to support telling a particular story) and positioning these into the display space. A contextual display assembly may be designed and provide in (or near) the display space such as to define lighting for the space during the timeline or time period of the display or show, to provide airflow for the display/show (which may also be varied during the display/show), and to provide other special effects.

The method continues at 510 with generating the media content for projection during the display/show. In some cases, this may be thought of as generating a first set of content for when the projection screen is in a first state, a second set of content for when the projection screen is in a second state (or transition state), a third set of content for when the projection screen is in a third state, and so on. The content typically will differ for each set at least in its mapping to the projection screen and also often in what is selected for projection. The media content may be created by positioning a person or character/figure (e.g., a person wearing a costume or the like) in the display space designed and populated in step 505 in the planned location for the mechanically animated object, and then videotaping the person/character/figure as they perform choreographed actions or performances for the particular display/show.

Concurrently, the contextual display assembly is operated according to a predefined set of display/show signals such that the person/character/figure is videotaped with the same lighting levels/colors and otherwise affected (such as with airflow from fans) by display system components operations as will occur during later operation of the display system to present the display/show. In other cases, a CG animation may be created for later projection by a video projector, and this CG animation would be created taking into account planned lighting and other components of the contextual display assembly (e.g., to "light" the animated character/object similarly as that planned for the display space). The videotaped content or CG animation file are stored in memory accessible by a controller of the display system in step 510.

In step 520, the method 500 continues with designing and fabricating (or otherwise obtaining) a projection screen to provide a projection surface with a silhouette or outer outline matching the size and shape of the character/figure/object used to generate the media content in step 510. For example, the character may be a human or be humanlike, and the projection screen may include a body with a shape generally matching the outer boundaries of a human body with a size of the person (with a costume on in some cases) who acted in step 510. One or more elements/members of the projection screen may be actuable or morphable, and a screen actuator may be chosen and coupled with the projection screen for later actuation of the projection screen. The projection screen and screen actuator are then positioned in the display space at a location defined for the mechanically animated object (e.g., same location where the actor videotaped in step 510 performed his/her role for the display/show). A video projector is provided in the display system and focused/directed to project its output light onto the projection surface of the screen positioned in step 520.

The method 500 continues at 530 with operating the projector of the display system to project the media content created in step 510 onto the projection surface of the screen. This may be thought of as projecting first media content onto the projection screen, with the projection screen in its first state (e.g., with the projection surface in a first state with a particular size, shape, and/or location). The method 500 continues at 540 with operating the screen actuator(s) to modify the projection screen to alter the shape, size, and/or location of its projection surface(s).

The method 500 includes at 550 with projecting more of the media content generated in step 510 onto the morphed/morphing and/or moved/moving projection screen and its surfaces. This may be thought of as projecting second media content (e.g., later captured video or CG animation later in the timeline of the display/show) onto the projection screen in its second state (e.g., with the projection surface in a second state differing in size, shape, and/or location than the projection surface in the first state). The method 500 may end at 590 or may continue at 550 with further modification/morphing of the projection screen such as to return it to its original or first state, and then repeating step 530.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

It is believed by the inventors that with modern hardware and software technology evolution combined with current day artistic projection methods (including projection mapping onto moving surfaces), the display system (and associated methods) provides a new and useful product that will be in great demand by designers of displays or attractions. A demonstration or test display system has been constructed to illustrate how convincing a projected person can be within a display space or scene. A person was videotaped while they were located in the display space at a predefined location for the screen assembly and with lighting at planned levels and colors (e.g., person was in a practical lit space). The screen assembly was fabricated to match the general silhouette of the videotaped person in size and outer shape, and the screen assembly was positioned in the display space at the predefined location and oriented with its projection surface(s) facing (e.g., orthogonal to or at least transverse to) the projector for front projection. The videotaped content of the person in the display space was then projected back into the same display space with the same lighting (e.g., from one or more lights provided as part of the contextual display assembly) and onto the projection surface of the screen assembly (e.g., onto a 2D projection surface provided using a flat piece of black foam core as the screen assembly element providing the projection surface). The illusion achieved was so good or of such high quality that not even those with experience in this field (or those with trained eyes) could tell that it was a projected person.

The display systems described wherein use the methods and techniques developed for this test or demo display system and, in many implementations, are provided by evolving the static projection surface to a programmable moving front projection surface that is designed to reflect a given media character's body/silhouette. As a result, the ability to enhance the motion profile of the character or other mechanically animated object is gained and provided by the display system. In operation of the system, as the character's silhouette moves so does the projection surface to perfectly reflect the image to the viewer's eyes. As the silhouette retracts (or otherwise changes in size and/or shape) so does the projection surface so that the imaged space (or projection space) returns to a void space.

It is likely that the display system (and associated methods) will find a broad range of uses for both props and characters in a wide variety of displays and/or attractions. If implemented carefully (or "correctly"), the display system can deliver an extremely high quality character presence in a space with unlimited expression and at a significantly lower cost than an animated figure with the same expression capability. The display systems can be said to provide projectormatronics (combination of a mechanically animated projection screen(s) with projected content suited to current state of the projection screen(s)) rather than using mere animatronics or other mechanical animation. The projectormatronic characters in some implementations of the display system would have the ability to morph into other characters (such as with the use of VFX) as long as the silhouette of the projected content remained the same. The moving silhouette screen component would provide the ability, for example, to turn a head, move an arm, and so on.

We claim:

1. A display system, comprising:
    a screen assembly with a projection surface;
    a screen actuator operable to transition the projection surface from a predefined initial state through a plurality of predefined transition states to a predefined final state, wherein the projection surface in the initial state, the transition states, and the final state differs from other ones of the states in at least one of size and shape;
    a projector operable to project first media content mapped to the initial state of the projection surface, transition media content, differing from the first media content, mapped to the transition states of the projection surface, and second media content, differing from the first media content and the transition media content, mapped to the final state of the projection surface in the final state; and
    a controller concurrently operating the screen actuator and the projector with time synchronization, wherein the projector projects the first media content when the projection surface is in the initial state, projects the transition media content when the projection surface is in the transition states, and projects the second media content when the projection surface is in the final state.

2. The display system of claim 1, wherein the first media content, the transition media content, and the second media content are generated and stored in memory accessible by the controller or projector prior to the operating of the screen actuator by the controller.

3. The display system of claim 2, wherein the generation of the first media content, the transition media content, and the second media content comprises simulating or predicting alterations in the projection surface from the initial state to the final state and creating media based on the simulated or predicted alterations.

4. The display system of claim 1, wherein the projection surface is three dimensional and is modified in all three dimensions by the screen actuator to transition the projection surface between the initial and final states.

5. The display system of claim 1, wherein the screen actuator is operable to provide the transition of the projection surface using inflation, folding, bending, stretching, pushing in and out, and rolling and unfurling the projection surface.

6. The display system of claim 1, wherein the projection surface is positioned within a display space and the display system further comprises a contextual display assembly operable to project or light the display space or objects placed in the display space based on and in synchronization with the first media content, the transition media content, and the second media content.

7. The display system of claim 6, wherein the first media content, the transition media content, or the second media content includes at least one feature linked to operations of the contextual display assembly.

8. A method of creating a display in a display space, comprising:
    generating first and second media content;
    after the generating, providing a projection screen, with a predefined shape and size, in the display space;
    projecting the first media content onto the projection screen;
    modifying the projection screen to alter at least one of the shape and the size of the projection screen; and
    concurrently with the modifying of the projection screen, projecting the second media content onto the projection screen, wherein the first media content is mapped to the shape and size of the projection screen during the projecting of the first media content and during the modifying of the projection screen, wherein the second media content is mapped to the modified shape and size during the projecting of the second media content, and wherein the second media content is mapped to the projection screen during transitions in the shape or the size during the modifying step.

9. The method of claim 8, wherein the generating of the first and second media content comprises generating simulations of the projection screen during the modifying and creating media content mapped to shapes and sizes of the generated simulations of the projection screen.

10. The method of claim 8, wherein the projection screen has a 3D surface and the modifying of the projection screen includes changing the 3D surface in three dimensions.

11. The method of claim 8, further comprising projecting first light or content onto surfaces in the display space proximate to the projection screen and projecting second light or content onto the surfaces in the display space proximate to the projection screen.

12. The method of claim 11, wherein the second light or content differs from the first light or content and is chosen based on the second media content.

13. A display system, comprising:
a display space;
at a location in the display space, an object with a surface;
an actuator mechanically animating the object to transition the surface from a first state to a second state that differs from the first state such that the surface changes shape, size, or location;
a projector projecting first content onto the surface with the surface in the first state, projecting transition media content onto the surface with the surface in transition states between the first and second states, and projecting second content onto the surface with the surface in the second state; and
a controller operating the actuator and the projector with time synchronization to perform the animating and the projecting, respectively,
wherein the surface in the transition states differs from the surface in at least one of shape, size, and location in the first and second states, and
wherein the first content differs from the transition content and the transition content differs from the second content.

14. The display system of claim 13, wherein the first content and the second media content are generated and stored in memory prior to the operating of the actuator to mechanically animate the object.

15. The display system of claim 14, wherein the first and second content is generated by videotaping a human actor in the display space at the location space.

16. The display system of claim 13, wherein the surface is three dimensional and is modified in three dimensions by the actuator to transition the surface between the first and second states.

17. The display system of claim 13, wherein the actuator is operable to provide the mechanical animating of the projection surface using at least one of inflation, folding, bending, stretching, pushing in and out, and rolling and unfurling the object.

18. The display system of claim 13, further comprising a contextual display assembly operable to project or light the display space or objects placed in the display space based on and in synchronization with the first and second content.

19. The display system of claim 18, wherein the first and second content includes at least one feature linked to operations of the contextual display assembly.

* * * * *